United States Patent [19]

Shklyanov et al.

[11] 4,084,484
[45] Apr. 18, 1978

[54] DEVICE FOR REMOVING INTERNAL CIRCULAR FLASH

[76] Inventors: Leonid Pavlovich Shklyanov, ulitsa Zhulyabina, 8, kv. 14; Vladimir Nikitich Baranov, prospekt Lenina, 30/13, kv. 16; Dmitry Nikiforovich Koltyrev, prospekt Juzhny, 22, korpus 3, kv. 78, all of Elektrostal Moskovskoi oblasti; Viktor Senderovich Lifshits, Kavkazsky bulvar, 21, korpus 2, kv. 41, Moscow; Ivan Ivanovich Polyansky, prospekt Lenina, 30/13, kv. 13; Tamila Iosifovna Osinskaya, ulitsa Zhulyabina, 3, kv. 91, both of Elektrostal Moskovskoi oblasti, all of U.S.S.R.

[21] Appl. No.: 699,634

[22] Filed: Jun. 24, 1976

[51] Int. Cl.² ............................................. B23D 1/24
[52] U.S. Cl. .................................... 90/24 C; 82/1.2; 82/82
[58] Field of Search ............... 90/24 C; 82/1.2, 1.3, 82/1.4, 4 C, 82

[56] References Cited

U.S. PATENT DOCUMENTS 3,103,834  9/1963  Neukom ........................... 90/24 C
3,859,877  1/1975  Sherer et al. ....................... 82/82

FOREIGN PATENT DOCUMENTS 402,427  2/1974  U.S.S.R. ............................... 82/82

*Primary Examiner*—Z. R. Bilinsky
*Attorney, Agent, or Firm*—Haseltine, Lake & Waters

[57] ABSTRACT

According to the present invention the radial feed mechanism comprises a hydraulic cylinder on the rod of which is rigidly fixed a holder connected with the housing of the radial feed mechanism by springs which ensure the cutting force of the cutting tool. At one end the springs bear against the housing of the radial feed mechanism while at the other end they bear against the holder rotated by a drive mounted on the tool head body and the shaft of said drive is rigidly connected with the housing of the radial feed mechanism. The housing of the radial feed mechanism carries a slide valve whose rod interacts with the profiled surface of a master form rigidly fixed on the tool head body. The holder is provided with rollers for tracing the internal surface of the welded pipe. The advantage of the device according to the present invention resides in that it ensures removal of flesh regardless of its temperature. Besides, the device allows the flash to be removed uniformly around the perimeter of the joint even in case the welded pipes are out-of-round. Further, the device allows to maintain practically constant cutting force during the flash-removing process.

3 Claims, 4 Drawing Figures

DEVICE FOR REMOVING INTERNAL CIRCULAR FLASH

The present invention relates to devices for machining hollow bodies of revolution and more particularly it relates to devices for removing internal circular flash remaining after resistance butt-welding of pipes.

Known in the previous art are devices for removing internal circular flash comprising a cantilevered rod carrying spring-loaded strikers. Under the effect of centrifugal forces the strikers rotated by an electric motor strike the circular weld whose temperature is 800°–1100° C, knock off the scale and smooth out the flash.

Another known device for removing internal circular flash during resistance butt-welding of pipes comprises a tool head with a body carrying a holder with a cutting tool, a radial feed mechanism accommodated in a housing of its own and a rotary drive of said mechanism, also an appliance for bringing the tool head to the flash removing zone. Said appliance carries a cantilevered rod whose free end is connected with the tool head.

A disadvantage of the above-mentioned flash removers resides in that the reliability of flash removal depends on the flash temperature.

If the above-mentioned flash removers have not been used in due time and the temperature of flash has dropped below the preset level, it happens often that the flash cannot be removed at all.

Another disadvantage of the above-mentioned flash removers lies in their failure to ensure uniform removal of flash around the pipe perimeter if the pipes are out-of-round and the welded joint is displaced.

Other disadvantages of the above-mentioned flash removers include also the nonuniform loading of the drive caused by the uniform feed of the tool irrespective of the flash cross section which grows towards its base.

The main object of the present invention is to provide a device for removing internal circular flash in resistance butt-welding of pipes which would ensure removal of flash regardless of its temperature.

Another object of the present invention is to provide a device for removing internal circular flash which would ensure uniform removal of internal circular flash regardless of the out-of-roundness and displacements in the welded joint.

And still another object of the invention is to provide a device for removing internal circular flash which would ensure variable radial feed within a revolution of the cutting tool in accordance with the geometry of flash.

These and other objects are accomplished by providing a device for removing internal circular flash during resistance butt-welding of pipes comprising a tool head with a body carrying a holder with a cutting tool, a mechanism for radial feed of the holder in a housing of its own, a rotary drive of said mechanism, and an appliance for bringing the tool head to the flash removing zone, said appliance being provided with a cantilevered rod whose free end is connected with the tool head wherein, according to the invention, the radial feed mechanism of the holder is made in the form of a hydraulic cylinder whose rod carries a rigidly secured holder connected with the housing of its radial feed mechanism by springs ensuring the cutting force of the cutting tool said springs bearing at one end against the housing of the radial feed mechanism while at the other end they bear against the holder which is rotated by a drive mounted on the tool head body, the shaft of said drive being connected rigidly with the housing of the radial feed mechanism of the holder, said housing carrying a slide valve whose rod interacts with the profiled surface of a master form rigidly fixed on the tool head body, the holder being also provided with rollers for tracing the internal surface of the welded pipe.

The device ensures uniformity of flash removal around the perimeter of the butt joint even if the wedled pipes are out-of-round. Besides, as the flash is being gradually removed, the device reduces the depth of cut proportionally to the changing shape of flash and thus retains the cutting force practically constant.

It is expedient that the tool head should have an aligning appliance comprising pushers installed radially in the tool head body and carrying shoes which are set in motion by hydraulic cylinders mounted on the tool head body.

The use of the aligning appliance ensures the minimum required travel of the cutting tool. Besides, by bringing the cutting tool as close as possible to the flash removing zone it is possible to shorten the cantilever arm and thus to increase the stiffness of the device in the course of cutting.

It is likewise expedient that the device for removing internal circular flash during resistance butt-welding of pipes should have an appliance for taking the flash away from the zone of its removal, said appliance being made in the form of electromagnetic coils with steel cores, secured in the lower part of the tool head body.

The appliance for taking the flash away from the zone of its removal makes it possible to produce a reinforcement of a uniform height of the internal surface of pipes by removing the cut-off flash falling in the lower part of the welded pipes from under the rollers which trace the internal surface of the welded pipes.

Now the invention will be described in detail by way of example with reference to the accompanying drawings in which.

Figure 1:
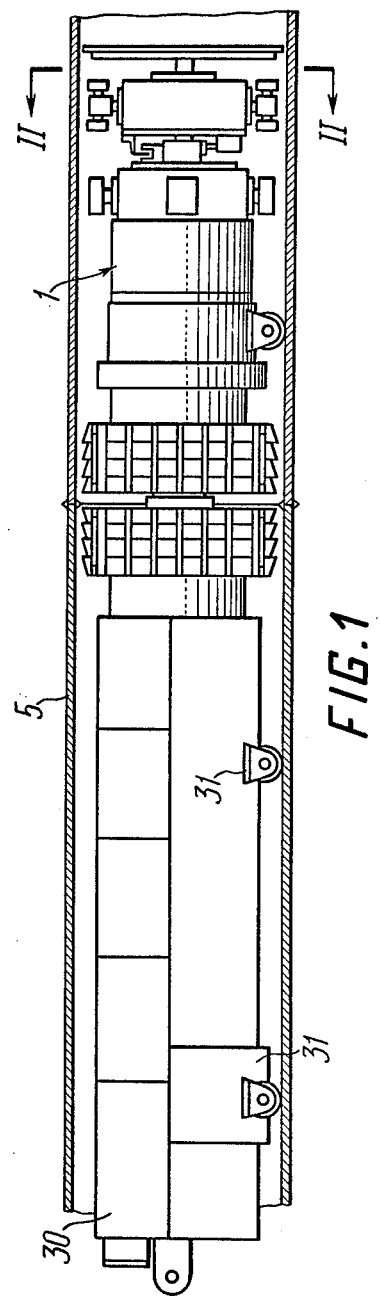
FIG. 1 is a general view of the device for removing internal circular flash during resistance butt-welding according to the invention.
Figure 2:
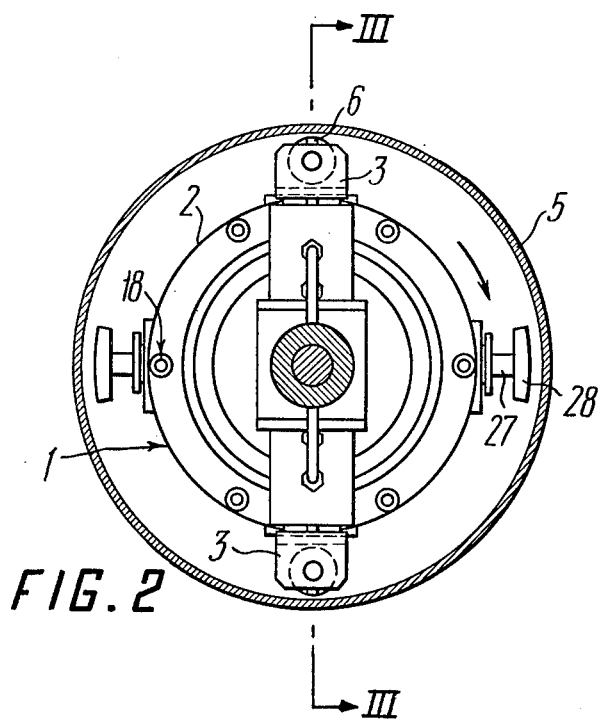
FIG. 2 is a section taken along line II—II in FIG. 1.
Figure 3:
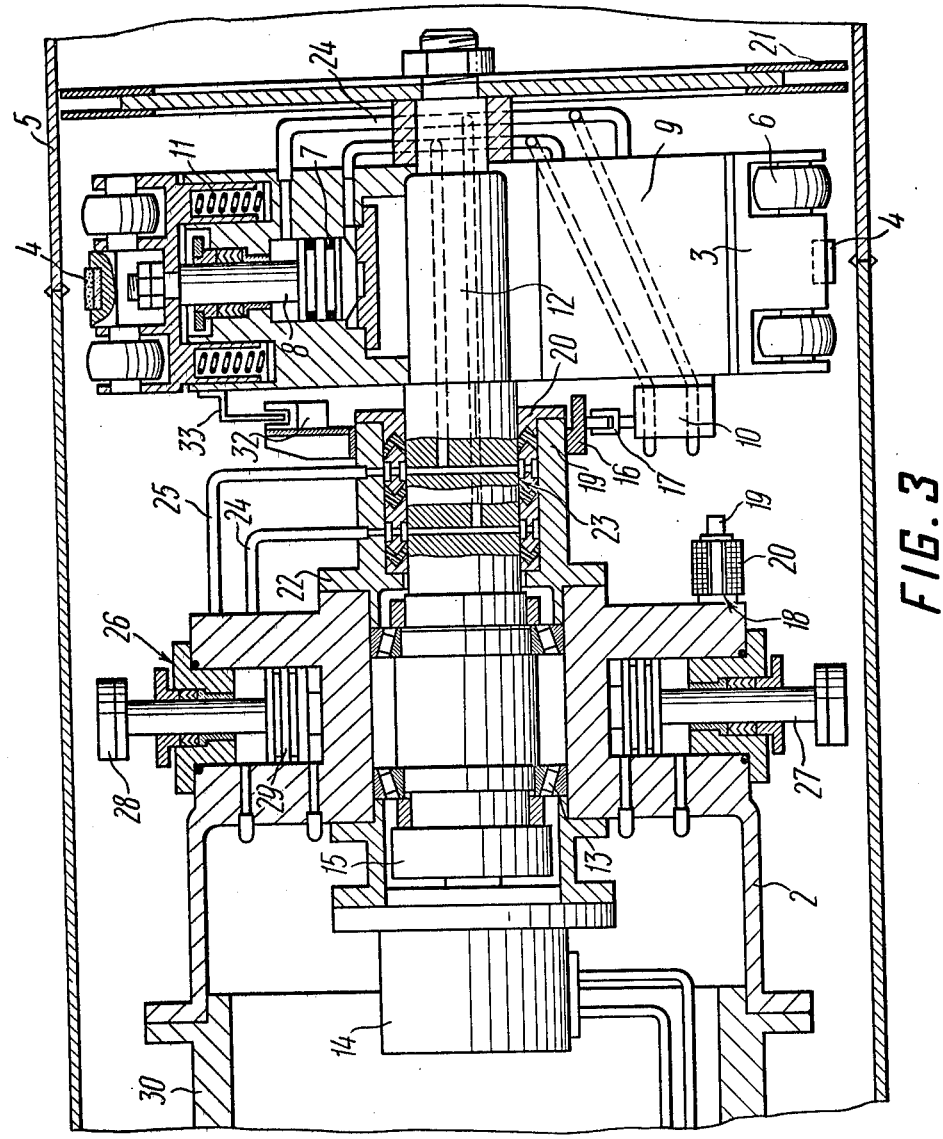
FIG. 3 is a section taken along line III—III in FIG. 2.

The device for removing internal circular flash during resistance butt-welding of pipes according to the invention comprises a tool head 1 (FIG. 1) with a body 2 (FIG. 2) carrying holders 3 (FIG. 3). The holders 3 clamp cutting tools, e.g. cutters 4 and have rollers 6 for tracing the internal surface of the welded pipes 5. The device according to the invention also comprises a mechanism for radial feed of the holders 3 in the form of hydraulic cylinders 7 whose rods carry the rigidly fixed holders 3. The housing 9 of said radial feed mechanism is provided with a slide valve 10. The hydraulic cylinders 7 controlled via the slide valve 10 are kinematically linked with the holders 3 by means of springs 11 which bear against the housing 9 of the radial feed mechanism at one end and against the holders 3 at the other.

The housing 9 of said mechanism is rigidly connected with the shaft 12 which is rotated in rolling-contact bearings 13 by a drive 14. The drive 14 may be hydraulic, pneumatic or electric.

The drive 14 is connected with the shaft 12 by a coupling 15.

Fastened rigidly to the tool head body 2 is a master form 16; during rotation of the holders 3 said master form interacts with the rod 17 of the slide valve 10.

The length and profile of the master form 16 are selected in accordance with the radial feed per revolution of the holder with the tool 4.

The device incorporates an appliance for taking the flash away from the zone of its removal, made in the form of electromagnets 18 secured in the lower part of the tool head body 2. The electromagnets 18 consist of steel cores 19 carrying electromagnetic coils 20.

The shaft 12 of the rotary drive 14 carries a scraper 21 and the body 2 has a flange 22 accommodating a seal 23. The seal 23 is in communication through a discharge pipe 24 with the under-piston chambers of the hydraulic cylinders 7 whereas their above-piston chambers are connected to free discharge through a discharge pipe 25.

The tool head 1 incorporates an aligning appliance 26 installed on its body 2, and radially-mounted pushers 27 with shoes 28. The pushers 27 with the shoes 28 are reciprocated by the hydraulic cylinders 29 mounted on the body 2 of the tool head 1.

The tool head 1 is cantilevered to the rod 30 (FIG. 1) provided with an appliance 31 for bringing the tool head to the flash removing zone.

To prevent the radial feed mechanism from stopping in a position when the rod 17 of the slide valve 10 is sunk by the master form 16, there is a limit switch 32 installed on the flange of the tool head 1, and a pressure strap 33 fastened to the housing 9 of the radial feed mechanism.

Figure 4:
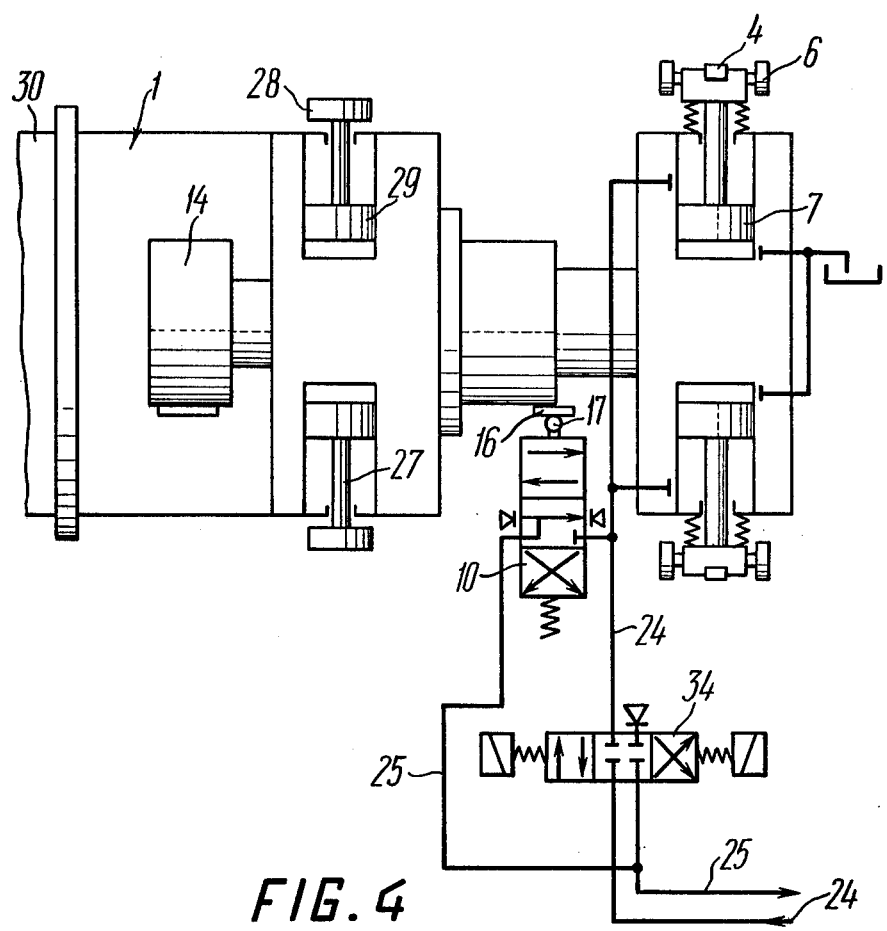
FIG. 4 is a hydraulic control diagram of the holder radial feed mechanism.

The limit switch 32 controls the slide valve 34 (FIG. 4) which, in turn, controls the travel of the holders 3 with the cutting tool 4.

The device for removing internal circular flash during resistance butt-welding of pipes operates as follows.

After the pipes 5 have been welded, the cutters 4 are brought by the appliance 31 to the flash-removing zone, aligning the axis of the cutter 4 with the welded joint.

The working fluid is fed under pressure into the above-piston chambers of the hydraulic cylinders 29 and the pipe 5 is clamped.

The working fluid into the piston chambers of the hydraulic cylinders 7 is fed from the hydraulic system (not shown in the Figure) through the slide valve 34. Then the drive 14 of the holders 3 with the cutters 4 is turned on. During each revolution of the cutters the master form 16 presses the rod 17 of the slide valve 10 with its profiled surface and puts the under-piston chambers of the hydraulic cylinder 7 in communication with discharge 25. Meanwhile, the holders 3 with the cutters 4 will be moved radially by the springs 11 through a distance determined by the volume of the fluid flowing from the under-piston chambers of the hydraulic cylinders 7 into the discharge pipeline 25.

The cutting process starts as soon as the cutters 4 come in contact with the flash.

The farther the holders 3 with cutters 4 move from the center of the pipe 5, the smaller becomes the force of the springs 11 and, consequently, the smaller the radial feed of each cutter 4 per revolution, the length of the master form 16 and the rotation speed during cutting being constant.

Thus, the feed per revolution of the holders 3 with cutters 4 in the course of cutting decreases as the cutters 4 approach the internal surfaces of the pipes 5 and, since the width of the flash correspondingly increases in height, the cutting force remains practically constant.

To keep the cutters 4 from biting into the body of the pipe 5 and to ensure the desired height of the weld reinforcement, the lips of the cutters 4 are set nearer to the rotation axis of the holders 3 than the generatrices of the tracing rollers 6.

The misalignment of the rotation axis of the holders 3 with the axis of the pipes 5 as well as the out-of-roundness of the pipes 5 are made up for in the course of flash cutting by springs 11. Simultaneously with the starting of the drive 14, the coils 20 of the electromagnets 18 are energized and their cores 19 attract the cut-off flash. This method of taking away the flash from the zone of its removal provides for normal working conditions of the tool 4.

As soon as the flash is completely cut off, the drive 14 is turned off. The under-piston chambers of the hydraulic cylinders 7 are put in communication with the discharge pipeline 24 by the slide valve 34. As a result, the holders 3 with the cutters 4 move radially towards the centre, to the initial position. The pipes 5 are released from the aligning appliance. After the pipes 5 have been released, the device is shifted for removing flash from the next joint of the welded pipes. The scraper 21 moves inside the pipes and pushes off the flash that has fallen on the bottom of the pipe after deenergizing of the electromagnetic coils 17.

We claim:

1. A device for removing internal circular flash during resistance butt-welding of pipes comprising: a tool head; an appliance for bringing said tool head to the flash removing zone; a rod, one end of which is cantilevered on said appliance for bringing said tool head to the flash-removing zone while its other end is connected to said tool head; said tool head comprises: a body; a holder with a cutting tool secured in it; a master form with a profiled surface, rigidly secured on said body of said tool head; a slide valve; a rod of said slide valve interacting with the profiled surface of said master form; a mechanism for radial feed of said holder carrying said slide valve; a housing on said radial feed mechanism; a rotary drive of said radial feed mechanism; said radial feed mechanism is made in the form of a hydraulic cylinder; a rod of said hydraulic cylinder, rigidly connected with said holder; springs ensuring the cutting force of said cutting tool; said springs bear at one end against said housing of the radial feed mechanism while their other ends bear against said holder; a rotary drive of said holder, installed on said body of said tool head; a shaft of said rotary drive of said holder, rigidly connected with said housing of said radial feed mechanism; rollers for tracing the internal surface of the welded pipes, installed on said holder.

2. A device according to claim 1 wherein the tool head incorporates an aligning appliance comprising pushers with shoes radially installed in the tool head body and actuated by the hydraulic cylinders mounted on the tool head body.

3. A device according to claim 1 incorporating an appliance for taking the flash away fron the zone of its removal, made in the form of electromagnetic coils with steel cores secured in the lower part of the tool head body.

* * * * *